United States Patent

Sanders

[15] 3,661,262
[45] May 9, 1972

[54] FILTRATION AND CIRCULATION SYSTEM FOR MAINTAINING WATER QUALITY IN MARICULTURE TANK

[72] Inventor: Graham Hodge Sanders, Elizabeth City, N.C.

[73] Assignee: Oceanography Mariculture Industries, Inc., Riviera Beach, Fla.

[22] Filed: Aug. 25, 1970

[21] Appl. No.: 66,826

[52] U.S. Cl. .................................210/169, 210/335, 119/3, 119/5
[51] Int. Cl. .....................................F04h 3/20, A01k 63/00
[58] Field of Search...................210/44, 152, 169, 335, 314; 119/2, 3, 5

[56] References Cited

UNITED STATES PATENTS

| | | | |
|---|---|---|---|
| 2,390,539 | 11/1945 | Katcher | 210/314 |
| 2,594,474 | 4/1952 | McGrath | 119/3 |
| 3,116,712 | 1/1964 | Ogden et al. | 119/5 |
| 3,513,978 | 5/1970 | Newsteder | 210/169 |

*Primary Examiner*—Charles N. Hart
*Attorney*—Oblon, Fisher & Spivak

[57] ABSTRACT

A filtration and circulation system for maintaining the water quality in a fish tank favorable for promoting the production and growth of fish therein and for circulating water therethrough at a rate designed to provide a high rate of water exchange in the tank. The system includes particulate, biological and activated charcoal filters serially arranged in pressurized and unpressurized sections thereof for converting or removing ammonia, waste food and excrement from the water. In addition, parallel flow paths from these filters through a protein skimmer and an ultraviolet sterilizer section, respectively, are provided for lower volume treatment of the water being circulated therethrough.

16 Claims, 3 Drawing Figures

INVENTOR
GRAHAM SANDERS

FILTRATION AND CIRCULATION SYSTEM FOR MAINTAINING WATER QUALITY IN MARICULTURE TANK

BACKGROUND OF THE INVENTION

This invention relates to the production and raising of food fish and, more particularly, concerns a filtration and circulation system for maintaining the water quality in a fish tank favorable for encouraging the production and growth of fish and for circulating water therethrough at a rate which is designed to provide a high rate of water exchange in the tank.

An ever-increasing demand for food fishes and the protein derived therefrom has given rise to increased interest on the part of commercial concerns in the "farming", or raising, of the same. The pompano, which is abundant in southern states during certain seasons, is one of the most delicious of the salt water food fishes, brings premium prices, and therefore is one of the most highly sought-after of the food fishes. For these reasons, also, it is probably the most attractive of all for mariculture.

Accordingly, the pompano has become the subject of very active mariculture study in recent years and various processes and techniques have been advanced for spawning, hatching and raising these fish under controlled environmental conditions which are designed to promote increased production and rapid growth thereof. Thus, free-circulating ponds open at both ends to tidal flow for introducing fresh sea water have been prepared and attempts have been made to promote the growth of fish in the pond by providing supplemental food and controlling water conditions by pumping tidal water therein.

More desirably, of course, the provision of a closed cycle fish tank, or fish tank system, wherein the environmental conditions of the water could be maintained most favorable for a specific phase in the fish production process, such as, for example, spawning, hatching, or raising of the fish, would permit greater control over the entire fish production process to be exercised. In such closed cycle fish tank systems, however, there is presented the problem of maintaining the proper water quality and of providing a reasonable circulation rate which is essential in mariculture, especially in pompano mariculture. Various filter arrangements have been proposed, but these have either been inadequate for maintaining good water quality, or, in the effort to do so, they have failed to achieve a sufficiently high flow rate.

SUMMARY OF THE INVENTION

Accordingly, it is an object of the present invention to provide a closed cycle fish tank and water circulation system having means associated therewith for maintaining the water quality therein favorable for increasing the production and growth of fish and for circulating the water through the tank at a rate sufficient to provide a relatively large number of tank water exchanges in each day.

Another object of the present invention is to provide an improved filtration system for maintaining the water quality in a fish tank favorable for increasing the production and growth of fish therein.

Still another object of the present invention is to provide an improved filtration and water circulation system for maintaining the quality of the water in a fish tank favorable for increasing the production and growth of fish therein and for circulating the water through the tank at a rate which is sufficient to provide a relatively large number of tank water exchanges in each day.

In accordance with the principles of the present invention, the foregoing and other objects are achieved by a combination water quality maintenance and circulation system which comprises, in association with the fish tank, a particulate filter and a biological filter which are serially connected, in vertically arranged relation, through a sump to a bank of activated charcoal filters, and means for pumping water from the tank to the particulate filter and from the sump to the activated charcoal filter bank. By-passes, or parallel flow conduits, are provided for detouring a portion of the main flow through a protein skimmer, or a device for removing high-molecular-weight organic material, en route to the particulate filter, and a portion of the main flow from the sump through an ultraviolet irradiation apparatus, instead of through the bank of activated charcoal filters, for return to the fish tank. Filtered water from the filter bank is conducted through another particulate filter, for removal of particles of the filtration material, before being returned to the fish tank.

BRIEF DESCRIPTION OF THE DRAWING

Various other objects, features and further attendant advantages of the present invention will be more readily appreciated as the same becomes better understood from the following detailed description when considered in connection with the accompanying Drawing, wherein like reference numerals are used for designating like or corresponding parts in the several figures, and in which.

DETAILED DESCRIPTION OF A PREFERRED EMBODIMENT

Figure 1:
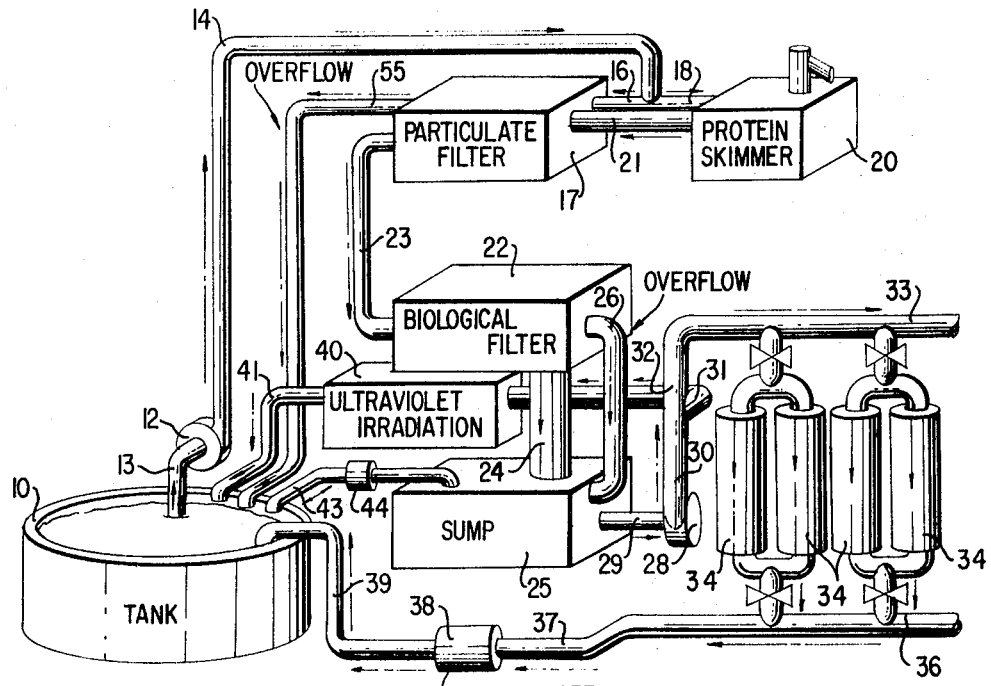
FIG. 1 is a schematic diagram of a filtration and circulation system in which the present invention is embodied.

Referring now to the drawing, and more particularly to FIG. 1, there is shown a filtration and circulation system for maintaining the water quality in a fish tank 10 favorable for encouraging the production and growth of fish and for circulating water therethrough at a rate designed to provide a high rate of water exchange in the tank which, being constructed in accordance with the teachings of the present invention, comprises a pump 12 being connected on the inlet side thereof to a fluid outlet pipe 13 from the tank 10 and on the outlet side thereof to a conduit 14 for delivering water from the tank 10 to the first stage of the filtration system.

The delivery conduit 14 connects with an inlet pipe 16 of a particulate filter 17 and with an inlet pipe 18 of a protein skimmer 20 of conventional design which serves to remove high molecular weight organic material from the water, which are toxic and would be dangerous to the fish if they were carried again into the water of the tank 10. The output of the skimmer 20 is returned to the main flow of water from the tank 10 for passage through the particulate filter 17 through a conduit 21.

Disposed below the particulate filter 17 is a biological filter 22 for receiving water descending by gravity from the particulate filter 17 through a conduit 23 connecting the lower portion of the particulate filter arrangement 17 with the upper portion of the biological filter. The biological filter 22 may be composed of a bed of sand and shells in which bacteria utilize the ammonia in the incoming water, which is constantly being produced in the system by excretion of fish animals and by the breakdown of organic substances in the culture medium, or water, for converting the same through an oxidizing process to the nitrite and then to the nitrate form. The bed is supported by some water-permeable substrate mesh or framework which permits the water to drain therethrough to the bottom of the biological filter container, from where it may flow, still under the effect of gravity, through a pipe 24 and into a sump 25 positioned therebelow.

An overflow pipe 26 is provided in the upper region of the biological filter 22, above the sand and shell bed therein, for passing any overflow to the sump 25 and thereby eliminating any excessive build-up of fluid in the filter 22 and maintaining adequate flow through the system.

Pressurized flow of water from the sump 25 is directed by a pump 28, connected at its inlet side to the sump 25 by a pipe 29, through an outlet pipe 30 and into divided conduits 31 and 32 branching therefrom. The main body of flow, or the larger portion of flow being moved by the pump 28 through its outlet 30, passes through the pipe 32 and into a manifold 33 which feeds a bank of activated charcoal, or resin, type filters 34. This filter bank comprises a plurality of closed containers in which the water if forced through a bed of charcoal or resin, in order to remove the nutrients, such as, for example, nitrates and nitrites, as well as any remnant ammonia. If desired, several of the elements may be used in parallel to increase capacity, and additional manifolds and filter banks may also be added as needed.

The outputs of the charcoal or resin filters 34 are collected in another manifold 36 and are conducted through a pipe 37 and another particulate filter 38, for removing any particles of filtration material, to an inlet pipe 39 of the tank 10. Obviously, the water tank input pipe 39 can be arranged to generate desirable circulation characteristics in the tank 10, and preferably is provided with means for aerating the filtered water flowing into the tank, such as, for example, a venturi arrangement, primarily for maintaining a good level of dissolved oxygen in the tank.

The portion of the flow being tapped off between the pump 28 and the manifold 33 and routed through the pipe 31 passes through an enclosure 40 for being treated with ultraviolet radiation. From the ultraviolet sterilizer 40, this part of the flow is conducted through a pipe 41 and returned thereby to the tank 10. Thus, a portion of the flow is continuously tapped off and treated with ultraviolet rays for further preventing the build-up of bacteria in the system.

The sump 25 is simply a reservoir which helps to maintain the desired circulation rate through the system. This is facilitated by a siphon pipe 43 connecting the sump 25 and the main tank 10 which is continuously primed to provide a balance between the pumps 12 and 28, and thereby in the case of an overflow in one part to conduct water from the sump to the tank and, alternatively, from the tank to the sump. The siphon pipe 43 is preferably provided with a particulate filter 44, such as, for example a screen of 50 micron aperture nylon mesh, for preventing particulate matter from reaching the last stages of the filter system, or the filter bank 34, through the sump 25. In addition, as a means to prevent bacteria build-up in the system, the water in the sump 25 may be treated with ozone, which may be generated in a commercial ozonizer and pumped into the sump.

Figure 2:
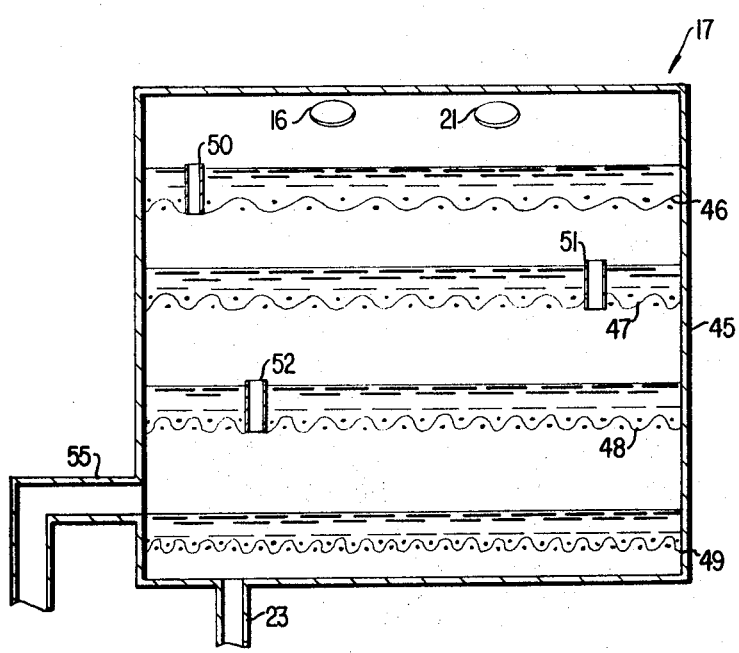
FIG. 2 represents a novel particulate filter arrangement that is useful in the practice of the invention.

Referring now to FIG. 2, there is shown a preferred embodiment of the particulate filter 17 which may be used in the filtration and circulation system of the present invention. As shown, the particulate filter 17 comprises a housing 45 having inlets 16 and 21 in the upper region thereof through which flow is received, respectively, from the pipe 14 and the protein skimmer 20. A series of vertically stacked, horizontally disposed screens 46, 47, 48, and 49, considered from top to bottom, which are made of monofilament synthetic polymer fibers such as nylon, and having apertures ranging from approximately 600 microns for the top screen 46 to 50 microns for the bottom screen 49, are supported in the housing 45 on annular brackets, not shown, or the like. The screen 46 is disposed about 2 inches below the level of an overflow outlet 50 whereby, in the event it should become clogged, the water being fed into the housing 45 through inlets 16 and 21 may bypass the screen 46 and immediately descend to the screen 47 therebelow. Similarly, overflow outlets 51 and 52 are provided above the screens 47 and 48, respectively, for permitting flow to bypass these screens in the event they should become clogged.

If the bottom, finest mesh screen 49 should clog, an overflow pipe 55 is provided, having an outlet from the housing 45 approximately 2 inches above the level of the screen 49, for routing the water back to the main tank 10. This prevents particulate matter from contaminating the remainder of the filtration system.

If desired, an alarm may be added to indicate clogging and overflow, or a second particulate filter similar to the filter 17 may be provided as an alternate path so that filtration can continue while the first filter is being cleaned.

Thus, it may be observed, that flow into the particulate filter 17 usually will proceed serially through the filter screens 46, 47, 48, and 49 and through the conduit 23 to the biological filter 22. In the event clogging of any of these filter screens occurs, however, overflow means are provided for bypassing the same and, in the case of the bottom filter 49, for returning the flow to the main tank.

Figure 3:
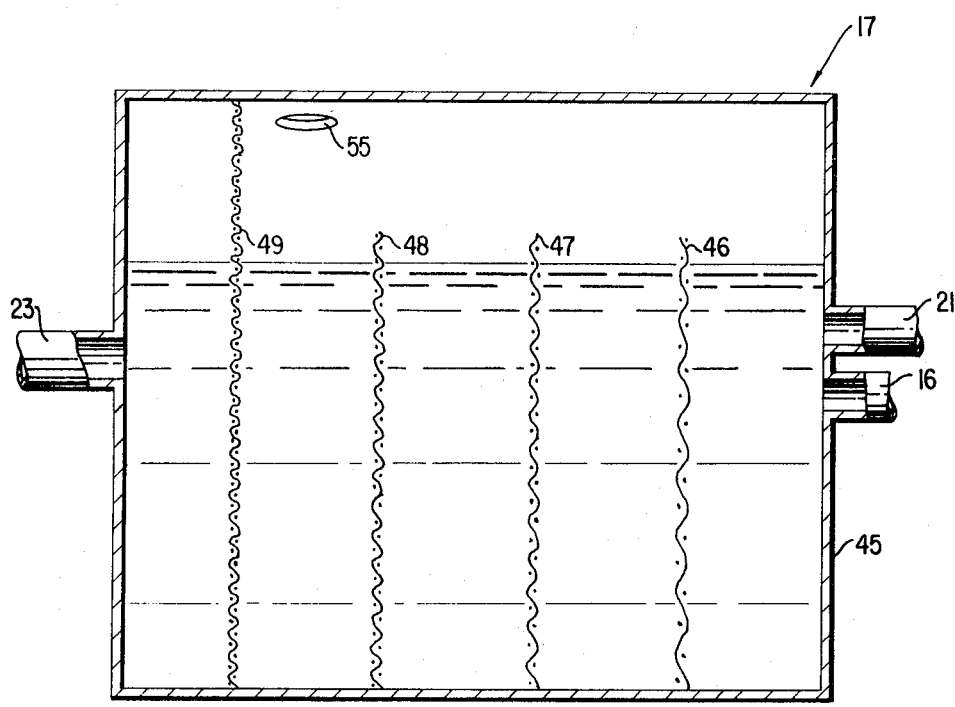
FIG. 3 represents a modified arrangement of the particulate filter illustrated in FIG. 2.

A modified arrangement of the particulate filter screens of the filter 17 is shown in FIG. 3. In this embodiment, the nylon mesh screens 46, 47, 48 and 49 are vertically disposed within the housing 45, being substantially parallel to each other and to the inlet and outlet ends of the housing. The general water flow is in a horizontal direction from the inlets 16 and 21 at one end of the housing 45 to the outlet 23 at the other, or opposite, end.

The screens 46, 47 and 48, considered from right to left, become increasingly finer in mesh size, and are of substantially the same dimensions otherwise so that the tops are all positioned substantially the same distance below the top of the housing 45 whereby, in the case of clogging, water can flow over the top of any screen into the next stage for filtering through the next finer screen. The last screen 49 in the flow path, which is the finest in mesh size, extends substantially to the top of the housing 45. Whenever flow through the filter screen 49 becomes clogged, the overflow pipe 55 positioned between the screens 48 and 49 comes into use, permitting the water flow to bypass the particulate filter 17 and be returned to the main tank 10.

As described hereinabove, an alarm may indicate clogging or overflow, or a second particulate filter may be brought into use to provide an alternate path and permit continuous filtration while the first filter is being cleaned.

Thus, in brief review, it may be seen that the present invention insures the maintenance of water quality in a closed cycle fish tank and water circulation system through a novel combination of filtration elements arranged for achieving high flow rate through the tank. Operatively, water is pumped from the fish tank to a particulate filter preferably comprising a series of nylon mesh screens with varying size mesh in successive order, the screens being arranged so that any of the first three can be bypassed if they clog. The water descends through the particulate filter by gravity flow to a biological filter preferably composed of sand and shells in which bacteria utilize the ammonia in the incoming water and convert it to nitrites and nitrates. From there, the water descends under gravity to a sump. From the sump, water is pumped to a manifold which feeds a bank of charcoal filters and a portion of this flow is tapped off and routed through an enclosure for treatment with ultraviolet radiation, the water from the ultraviolet treatment section being returned directly to the main tank. In the final stage, filtered water is conducted from the filter bank via a pipe back to the fish tank, whereby high flow rate is accompanied by a consequent rate of tank water exchange and good water quality is maintained.

Additional features of the invention include the tapping off of a portion of the flow from the tank to the particulate filter and pumping the same through a protein skimmer for removing high molecular weight organic material, the output of the skimmer being returned to the main flow for passage through the particulate filter. Also, a continuously primed siphon connecting the main tank and the sump for directing flow from either one to the other serves to maintain steady flow through the system.

Although the foregoing description relates primarily to pompano mariculture, in addition thereto, of course, the filtration and circulation system which is herein described also is useful for maintaining the water quality in tanks for other allied species of food fish and it is intended that the extension of its use to controlling the environment of other fish is part of the teachings thereof.

Obviously, many modifications and variations of the present invention are possible in light of the above teachings. It is therefore to be understood that within the scope of the appended claims, the invention may be practiced otherwise than as specifically described herein.

What is claimed and desired to be secured by letters patent of the United States is:

1. In combination with a fish tank, a filtration and circulation system for insuring maintenance of water quality therein, comprising:
   particulate filter means,
   means for pumping liquid from said fish tank to said particulate filter means,
   biological filter means,
   conduit means connecting said biological means and said particulate filter means,
   a sump,
   conduit means connecting said biological filter means and said sump,
   water purifying filter means,
   means for pumping water from said sump to said water purifying filter means, and,
   conduit means connecting said water purifying filter means and said fish tank for returning filtered water from said filter means to said tank.

2. The apparatus set forth in claim 1, wherein said particulate filter means comprises a series of mesh screens with decreasing size mesh in the successive order in which water passes therethrough, and,
   means for bypassing any one of said series of screens.

3. The apparatus set forth in claim 1, wherein said particulate filter means comprises:
   a housing,
   inlet means in the upper portion of said housing,
   a plurality of vertically arranged, horizontally disposed mesh screens disposed below said inlet,
   outlet means disposed below said mesh screens,
   overflow means disposed above the level of the lowermost mesh screen and below the level of the second lowermost mesh screen for returning liquid to the fish tank when said liquid reaches the level of said overflow means, and,
   overflow means above the levels of all but the lowermost one of said mesh screens for bypassing each of said screens and permitting flow to the next lower of said screens.

4. The apparatus set forth in claim 1, further including:
   means for removing high molecular weight organic material from said liquid,
   means for bypassing a portion of the liquid being pumped from said tank to said particulate filter means to said organic material removing means, and,
   conduit means connecting said organic material removing means and said particulate filter means.

5. The apparatus set forth in claim 1, further comprising:
   ultraviolet irradiation means,
   means for bypassing a portion of the liquid being pumped from said sump to said purifying filter means to said ultraviolet irradiation means, and,
   conduit means connecting said ultraviolet irradiation means and said fish tank.

6. The apparatus set forth in claim 1, further comprising continuously primed siphon means connecting said fish tank and said sump.

7. The apparatus set forth in claim 6, further comprising particulate filter means in said siphon means.

8. The apparatus set forth in claim 1, further comprising particulate filter means in said means for returning said filtered water from said purifying filter means to said fish tank.

9. The apparatus set forth in claim 1, wherein said water purifying filter means is activated charcoal.

10. The apparatus set forth in claim 1, wherein said water purifying filter means is a resin.

11. The apparatus set forth in claim 1, wherein said water purifying filter means comprises a plurality of filtering units, and,
    said means pumping liquid from said sump to said water purifying filter means includes a manifold connected with each of said plurality of filtering units.

12. The apparatus set forth in claim 1, wherein said particulate filter means comprises:
    a housing;
    inlet means in one end of said housing;
    outlet means disposed in the opposite end of said housing;
    a plurality of parallel, vertically disposed mesh screens horizontally arranged in series within said housing between said inlet and outlet ends thereof, and
    overflow means above the levels of all but the end screen nearest said outlet end and disposed between said end screen and the screen adjacent thereto for returning liquid to the fish tank when said liquid reaches the level of said overflow means.

13. In combination with a fish tank, a filtration and circulation system for insuring maintenance of water quality therein, comprising:
    particulate filter means,
    means for pumping liquid from said tank to said particulate filter means,
    means for removing high molecular weight organic material from said liquid,
    means for bypassing a portion of the flow of said liquid being pumped from said tank to said particulate filter means and directing the same to said organic material removing means,
    conduit means connecting said organic material removing means and said particulate filter means,
    biological filter means,
    conduit means connecting said biological filter means and said particulate filter means,
    a sump,
    conduit means connecting said biological filter means and said sump,
    water purifying filter means,
    means for pumping liquid from said sump to said water purifying filter means,
    ultraviolet irradiation means,
    means for bypassing a portion of the liquid being pumped from said sump to said water purifying filter means and directing the same to said ultraviolet irradiation means,
    conduit means connecting said ultraviolet irradiation means to said fish tank, and,
    means for returning the filtered water from said water purifying filter means to said fish tank.

14. The apparatus set forth in claim 13, further including continuously primed siphon means between said fish tank and said sump.

15. The apparatus set forth in claim 13, wherein said particulate filter means comprises a series of particulate filter screens arranged for receiving in a successive order the liquid being received thereby from said fish tank and said organic material removing means, and,
    means for bypassing each one of said series of screens upon clogging thereof and directing the liquid to the next succeeding one of said screens in said succession of order.

16. The apparatus set forth in claim 15, wherein the bypass of the last of said filter screens in said succession of order is connected with said fish tank for returning liquid thereto and thereby preventing contamination of the remainder of said filtration system.

* * * * *